(12) United States Patent
Huang et al.

(10) Patent No.: US 10,812,006 B2
(45) Date of Patent: Oct. 20, 2020

(54) MOTOR DRIVE DEVICE, CONTROL METHOD AND MOTOR

(71) Applicant: Silergy Semiconductor Technology (Hangzhou) LTD, Hangzhou, ZheJiang Province (CN)

(72) Inventors: Xiaodong Huang, Hangzhou (CN); Lei Shen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/248,935

(22) Filed: Jan. 16, 2019

(65) Prior Publication Data

US 2019/0253016 A1    Aug. 15, 2019

(30) Foreign Application Priority Data

Feb. 11, 2018    (CN) .......................... 2018 1 0142978

(51) Int. Cl.
*H02P 27/12*       (2006.01)
*H02P 21/32*       (2016.01)
*H02P 21/22*       (2016.01)

(52) U.S. Cl.
CPC .............. *H02P 27/12* (2013.01); *H02P 21/22* (2016.02); *H02P 21/32* (2016.02)

(58) Field of Classification Search
CPC .................................. H02P 27/12; H02P 21/22
USPC ................................ 318/400.01, 400.02, 700
See application file for complete search history.

(56) References Cited

U.S. PATENT DOCUMENTS

| 6,346,785 | B1* | 2/2002 | Dainez .................... H02P 6/085 318/400.01 |
| 7,339,406 | B2* | 3/2008 | Takeuchi ............... H03K 4/502 327/131 |
| 8,872,457 | B2* | 10/2014 | Knecht ................... H02P 6/085 318/400.35 |
| 9,716,454 | B2 | 7/2017 | Huang et al. |
| 9,774,285 | B2 | 9/2017 | Huang et al. |
| 9,837,946 | B2* | 12/2017 | Feng ......................... H02P 6/18 |
| 2009/0322266 | A1 | 12/2009 | Dahlberg |
| 2011/0031922 | A1 | 2/2011 | Sajai et al. |
| 2012/0256573 | A1 | 10/2012 | Ikei |
| 2015/0097510 | A1 | 4/2015 | Katayama et al. |
| 2015/0171781 | A1 | 6/2015 | Vacon |
| 2016/0144508 | A1 | 5/2016 | Nakajima |

FOREIGN PATENT DOCUMENTS

| CN | 103825508 A | 5/2014 |
| CN | 105959518 A | 9/2016 |

* cited by examiner

*Primary Examiner* — David Luo
(74) *Attorney, Agent, or Firm* — Michael C. Stephens, Jr.

(57) ABSTRACT

A motor drive device can include: a control circuit configured to adjust each phase current of a three-phase inverter of a motor; where the phase current of the three-phase inverter rises from zero to a first threshold during a first time interval; and where the phase current is controlled to drop gradually from the first threshold to zero during a second time interval in order to increase the second time interval.

20 Claims, 10 Drawing Sheets

FIG. 10

MOTOR DRIVE DEVICE, CONTROL METHOD AND MOTOR

RELATED APPLICATIONS

This application claims the benefit of Chinese Patent Application No. 201810142978.X, filed on Feb. 11, 2018, which is incorporated herein by reference in its entirety.

FIELD OF THE INVENTION

The present invention generally relates to the field of power electronics, and more particularly to motors and associated motor drive devices and methods.

BACKGROUND

Motors may generally be divided into synchronous motors and brushless DC motors. Synchronous motors are widely used due to characteristics of good torque stability and low noise. Relatively smooth drive torque can improve the torque control of the motor and reduce starting noise during the drive control of the motor. During the starting process of the motor, initial position information of the rotor can be obtained by sampling a bus current of a three-phase inverter such that drive control of the motor can be achieved. However, each phase current of the three-phase inverter may rise to a predetermined threshold at different slopes in accordance with different inductance values of different excitation phases, and can suddenly drops to zero. Therefore, during the starting process of the motor, undesirable noise generated by such sudden changes of the phase current may be introduced.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a motor drive device can include: (i) a control circuit configured to adjust each phase current of a three-phase inverter of a motor; (ii) where the phase current of the three-phase inverter rises from zero to a first threshold during a first time interval; and (iii) where the phase current is controlled to drop gradually from the first threshold to zero during a second time interval in order to increase the second time interval. In one embodiment, a method of controlling a motor drive device of a motor can include: (i) controlling a phase current of a three-phase inverter of the motor to rise from zero to a first threshold in a first time interval; and (ii) controlling the phase current to drop gradually from the first threshold to zero in a second time interval in order to increase the second time interval.

Figure 1:
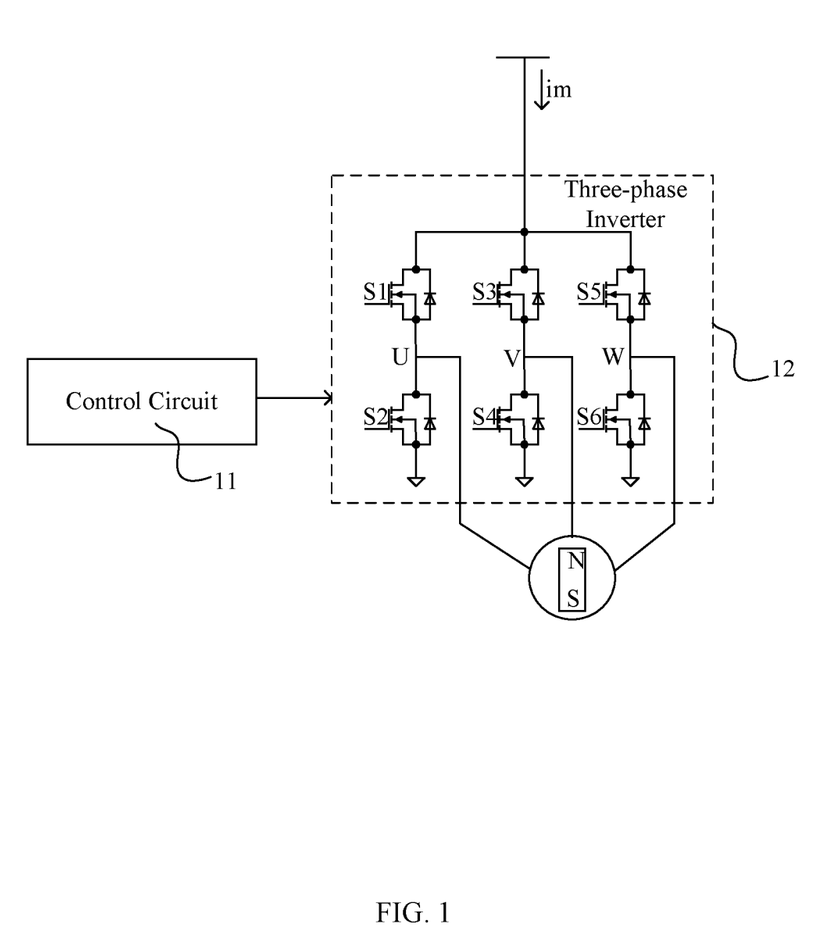
FIG. 1 is a schematic block diagram of an example motor drive device, in accordance with embodiments of the present invention.

Referring now to FIG. 1, shown is a schematic block diagram of an example motor drive device in accordance with embodiments of the present invention. In this particular example, the motor can include three-phase inverter 12, and the motor drive device can include control circuit 11. Control circuit 11 can generate a pulse width modulation signal based on a time sequence control signal. The on and off states of switches (e.g., switches S1-S6) of three-phase inverter 12 can be controlled based on the pulse width modulation signal to adjust each phase current of three-phase inverter 12. When the switch of each phase is on, bus current "im" may be equal to the phase current of corresponding phase. Thus, bus current im can characterize each phase current of three-phase inverter 12, respectively. The pulse width modulation signal may have a second duty cycle that is variable in a second time interval, and the second time interval can be a length of time during which the phase current of three-phase inverter 12 drops from a first threshold to zero. As such, bus current im may also drop from the first threshold to zero.

When the pulse width modulation signal has the second duty cycle, the second time interval of the phase current of three-phase inverter 12 can be increased in order to prevent the phase current of three-phase inverter 12 from suddenly dropping from the first threshold to zero, thereby avoiding causing the associated noise. During the second time interval, the phase current of three-phase inverter 12 can drop gradually, thus the second duty cycle can be variable. Every two phases of three-phase inverter 12 can conduct in turn, such that the second time interval should be ended before the phase current of three-phase inverter switches. In addition, the pulse width modulation signal can be controlled by control circuit 11 to switch to a signal with the second duty cycle when the phase current of three-phase inverter 12 rises to the first threshold, such that the phase current of three-phase inverter 12 can gradually drop to zero. For example, the second duty cycle is a value that drops gradually to improve the efficiency of motor drive on the premise of adaptively increasing the second time interval.

The pulse width modulation signal may have a first duty cycle that is fixed in a first time interval, such that the phase current of three-phase inverter 12 can rise in a sawtooth wave shape. The length of time during which the phase current of three-phase inverter 12 rises from zero to the first threshold is the first time interval. During the first time interval, the phase current of three-phase inverter 12 can rise gradually. For example, the first duty cycle can be set within a range that is greater than 0.5 and less than or equal to 1. In particular embodiments, the phase current of the three-phase inverter can be adjusted by the pulse width modulation signal generated based on the time sequence control signal, such that the phase current of the three-phase inverter can vary along with the pulse width modulation signal, thereby achieving silent startup of the motor.

Figure 2:
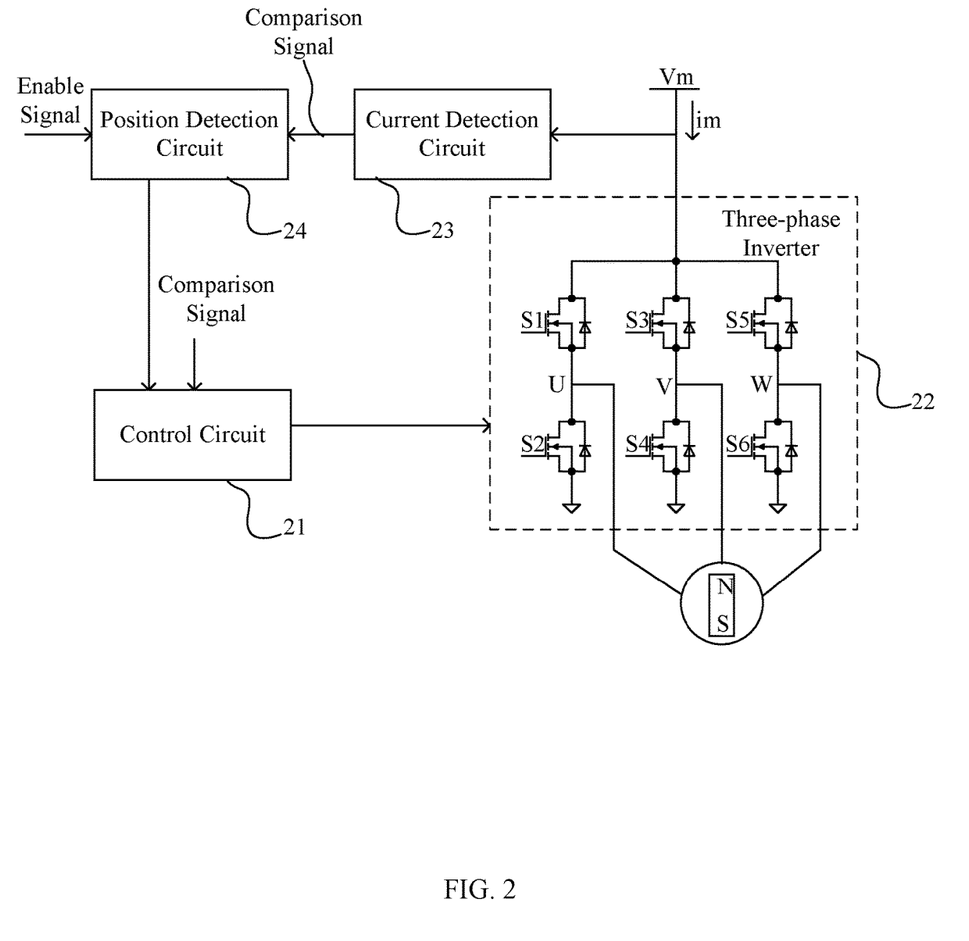
FIG. 2 is a schematic block diagram of another example motor drive device, in accordance with embodiments of the present invention.

Referring now to FIG. 2, shown is a schematic block diagram of another example motor drive device in accordance with embodiments of the present invention. In this particular example, the motor can include three-phase inverter 22, and the motor drive device can include control circuit 21, current detection circuit 23, and position detection circuit 24. The control method of control circuit 21 can be substantially the same as that of the control circuit in FIG. 1. Current detection circuit 23 can sample bus current im of three-phase inverter 22 and generate a comparison signal. Position detection circuit 24 can detect a minimum time length signal that the corresponding phase current of three-phase inverter 22 rises from zero to the first threshold based on the comparison signal when every two phases of three-phase inverter 22 (e.g., U phase and V phase) are sequentially turned on, in order to determine the initial position information of the rotor. In addition, control circuit 21 can adjust the time sequence control signal based on the initial position information of the rotor, and control three-phase inverter 22 to complete the startup of the motor.

During the period for detecting the initial position of the rotor, the motor can be in a stationary state. In other words, during the period for detecting the initial position of the rotor, the generated torque is not enough to drive the rotor of the motor to rotate due to small phase current of the three-phase inverter. Thus, the initial position of the rotor can be accurately detected through a current pulse detection method on the premise that the rotor of the motor does not rotate. After detecting the initial position of the rotor, the motor may need be started, thus the time sequence control signal may be adjusted such that phase current of three-phase inverter 22 can drive the rotor.

In this particular example, control circuit 21 can control the pulse width modulation signal to switch from the signal with the first duty cycle to the signal with the second duty cycle in accordance with the comparison signal. For example, during the period that the phase current of three-phase inverter 22 rises from zero to the first threshold, the pulse width modulation signal is the signal with the first duty cycle. When the phase current of three-phase inverter 22 reaches the first threshold, the comparison signal is changed, and the pulse width modulation signal may be switched to the signal with the second duty cycle from the signal with the first duty cycle. In this way, the phase current of the three-phase inverter can be adjusted by the pulse width modulation signal generated based on the time sequence control signal, such that the phase current of the three-phase inverter can vary with the pulse width modulation signal, thereby achieving the silent startup of the motor.

Figure 3:
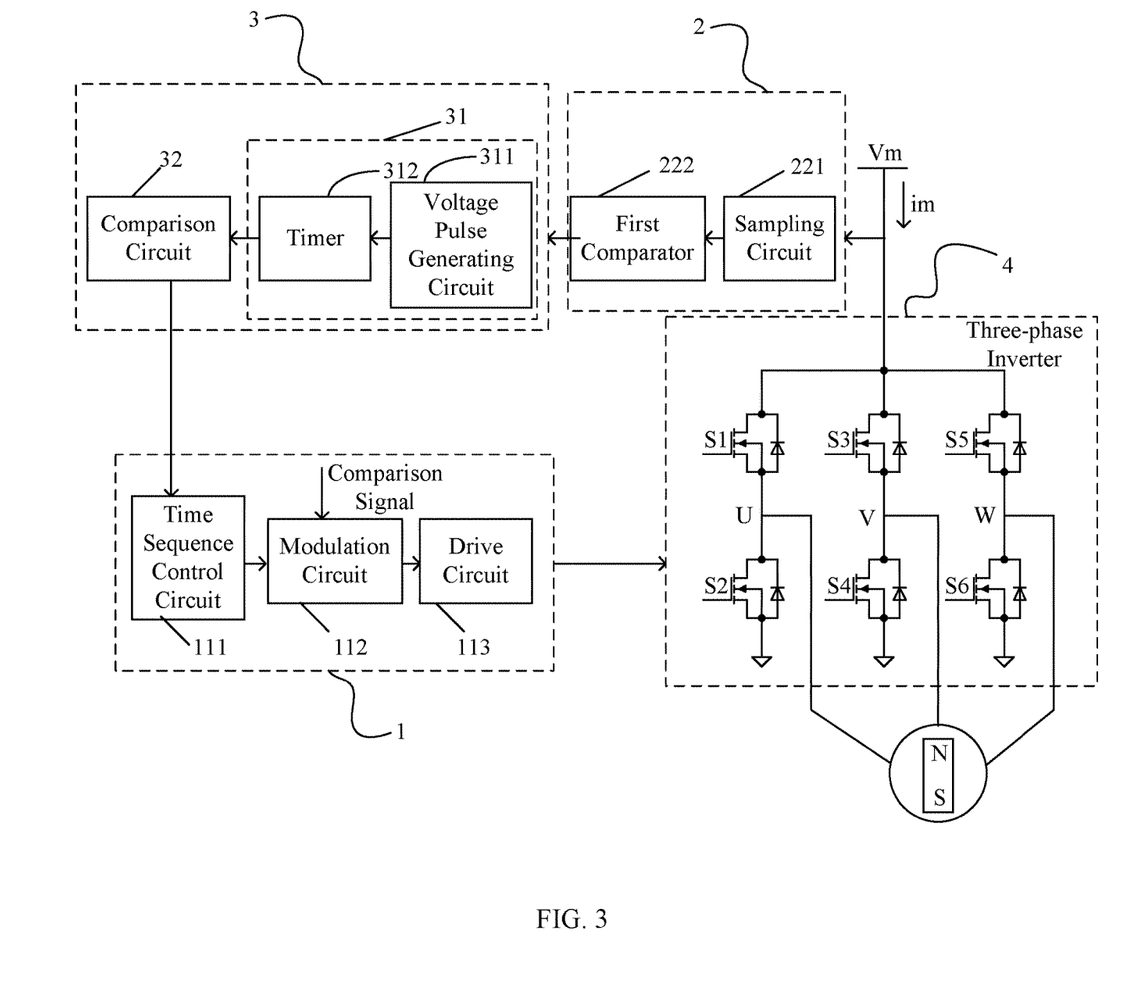
FIG. 3 is a schematic block diagram of an example motor drive device, in accordance with embodiments of the present invention.

Referring now to FIG. 3, shown is a schematic block diagram of an example motor drive device in accordance with embodiments of the present invention. The motor drive device can detect the initial position of the rotor of the motor and drive the motor to operate. In this particular example, the motor can include the rotor and three-phase inverter 4, which can include three excitation phases U, V, and W. Also, the motor drive device can include control circuit 1, current detection circuit 2 and position detection circuit 3. Control circuit 1 can generate a pulse width modulation signal based on a time sequence control signal. For example, control circuit 1 can include a programmable controller (e.g., MCU, FPGA, etc.) that can generate a pulse width modulation signal with a first duty cycle in a first time interval and a pulse width modulation signal with a second duty cycle in a second time interval. The first time interval can be a length of time during which the phase current of three-phase inverter 4 rises from zero to a first threshold, and the second time interval may be a length of time during which the phase current of three-phase inverter 4 drops from the first threshold to zero.

The switches (e.g., S1-S6) of three-phase inverter 4 can be controlled to be turned on and off based on the pulse width modulation signal, in order to adjust the phase current of three-phase inverter 4. Due to the pulse width modulation signal with corresponding duty cycles, three-phase inverter 4 can be in a first state and in a second state in a voltage vector interval (e.g., the time duration in which two phases of three-phase inverter 4 continuously conduct). In the first state, three-phase inverter 4 can provide excitation to the corresponding excitation phases, and then the phase current of three-phase inverter 4 may rise. In the second state, three-phase inverter 4 may stop to provide excitations, and then the phase current may drop. In this example, the first duty cycle is greater than 0.5 (e.g., the time that the phase current rises is greater than the time that the phase current drops), thus the phase current may rise slowly in the sawtooth wave shape in the whole first time interval.

Therefore, the current may not change suddenly, avoiding the introduction of noise during the detection process. Also, the second duty cycle can gradually drop to zero, thus the phase current may drop slowly in a serrated manner in the second time interval. For example, phases U and W are the two excitation phases. In the first state, switches S1 and S6 can be controlled to be turned on and the phase current of three-phase inverter 4 gradually rises. In the second state, switches S1 and S6 can be controlled to be turned off, the phase current gradually drops through the body diodes of switches S2 and S5. Thus, the phase current can slowly rise to the predetermined first threshold in the voltage vector interval.

The pulse width modulation signal can be controlled by control circuit 1 to switch to the signal with the second duty cycle when the phase current rises to the first threshold, such that the phase current can gradually drop to zero, thereby avoiding the introduction of noise into the motor due to sudden changes in the phase current during the detection process. In an alternative implementation, the second duty cycle is a gradually decreasing value. For example, control circuit 1 can include time sequence control circuit 111, modulation circuit 112 and drive circuit 113. Time sequence control circuit 111 can generate the time sequence control signal to define the voltage vector intervals corresponding to the phase current of the three-phase inverter. That is, control circuit 1 can control the on and off states of the switches of three-phase inverter 4 to switch the phase current based on the time sequence control signal.

Modulation circuit 112 can generate the pulse width modulation signal based on the time sequence control signal. For example, modulation circuit 112 can generate the pulse width modulation signal with the first duty cycle in the first time interval during which the phase current rises from zero to the first threshold, and can generate the pulse width modulation signal with the second duty cycle in the second time interval during which the phase current drops to zero from the first threshold. Drive circuit 113 can control three-phase inverter 4 based on the pulse width modulation signal. For example, drive circuit 113 can control three-phase inverter 4 to switch excitation phases among phases U, V, and W based on the pulse width modulation signal. Also, drive circuit 113 can control the on and off states of three-phase inverter 4 in each voltage vector interval based on the pulse width modulation signal.

Figure 4:
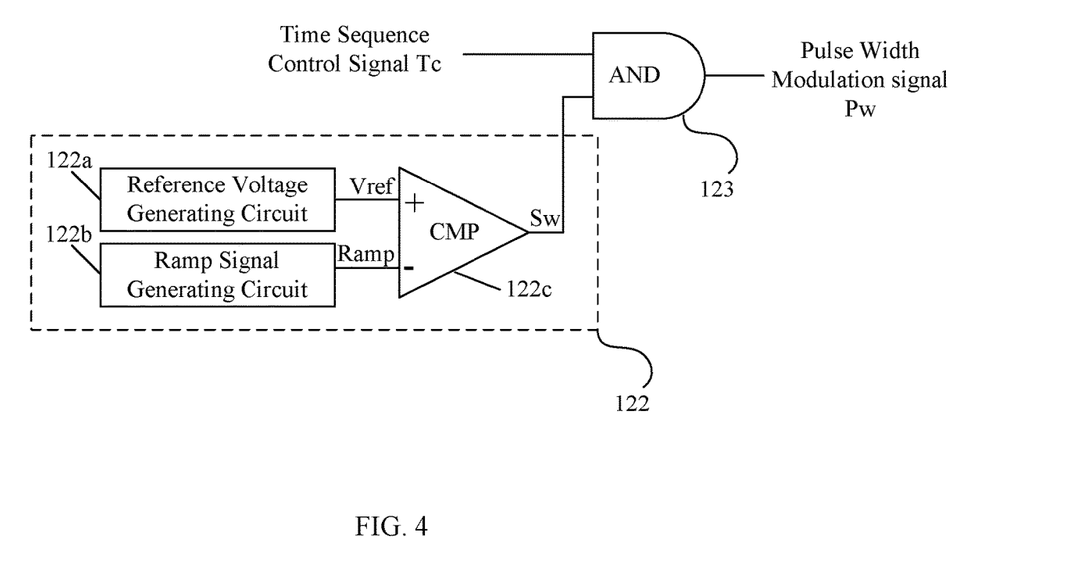
FIG. 4 is a schematic block diagram of an example modulation circuit, in accordance with embodiments of the present invention.

Referring now to FIG. 4, shown is a schematic block diagram of an example modulation circuit, in accordance with embodiments of the present invention. In this particular example, modulation circuit 112 can include square wave signal generating circuit 122 and logic circuit 123. Square wave signal generating circuit 122 can generate square wave signal Sw having the first duty cycle in the first time interval, and may generate square wave signal Sw having the second duty cycle in the second time interval. It should be understood that the duty cycle of the pulse width modulation signal and the square wave signal can be consistent with (e.g., the same as) each other. For example, the first duty cycle may be greater than 0.5 and less than or equal to 1, and the second duty cycle may be a gradually decreasing value.

For example, square wave signal generating circuit 122 can include reference voltage generating circuit 122a, ramp signal generating circuit 122b, and comparator 122c. Reference voltage generating circuit 122a can generate reference voltage Vref, which can correspond to the first duty cycle in the first time interval, and to the second duty cycle in the second time interval. Therefore, reference voltage Vref may be a first fixed value in the first time interval and a gradually decreasing value in the second time interval. Ramp signal generating circuit 122b can generate ramp signal Ramp. Comparator 122c can compare reference voltage Vref against ramp signal Ramp, and may generate square wave signal Sw. For example, a first input terminal of comparator 122c can receive reference voltage Vref, a second input terminal of comparator 122c can receive ramp signal Ramp, and an output terminal can generate corresponding square wave signal Sw.

It should be understood that square wave signal generating circuit 122 shown in FIG. 4 is an example circuit structure for generating a square wave signal, and other types of circuit structures (e.g., replacing the ramp signal with a sinusoidal half-wave signal, etc.) for generating the square wave signal can also be utilized in particular embodiments. Logic circuit 123 can be an AND-gate for outputting pulse width modulation signal PW after an AND operation of time sequence control signal Tc and square wave signal Sw.

Figure 5:
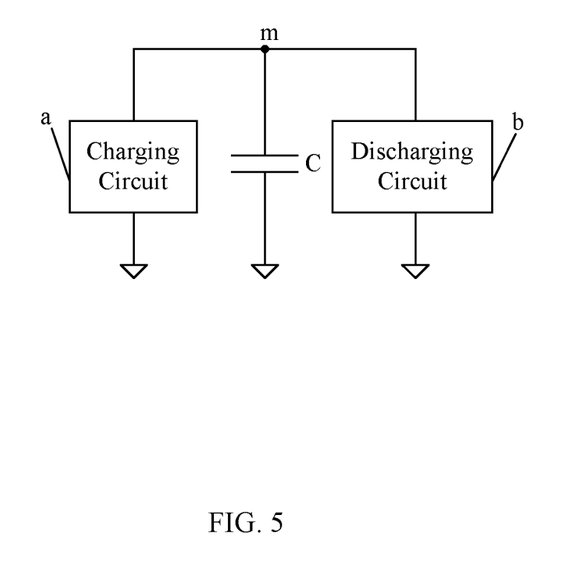
FIG. 5 is a schematic block diagram of an example reference voltage generating circuit, in accordance with embodiments of the present invention.

Referring now to FIG. 5, shown is a schematic block diagram of an example reference voltage generating circuit in accordance with embodiments of the present invention. In this particular example, reference voltage generating circuit 122a can include charging circuit a, capacitor C, and discharging circuit b. Charging circuit a, coupled between node m and ground, can charge the capacitor in gaps between different voltage vector intervals, such that the node voltage of node m (e.g., reference voltage Vref) is the first fixed value in the first time interval. Discharging circuit b, coupled between node m and ground, can discharge the capacitor in the second time interval, such that the node voltage of nod m gradually decreases from the first fixed value in the second time interval.

Figure 6:
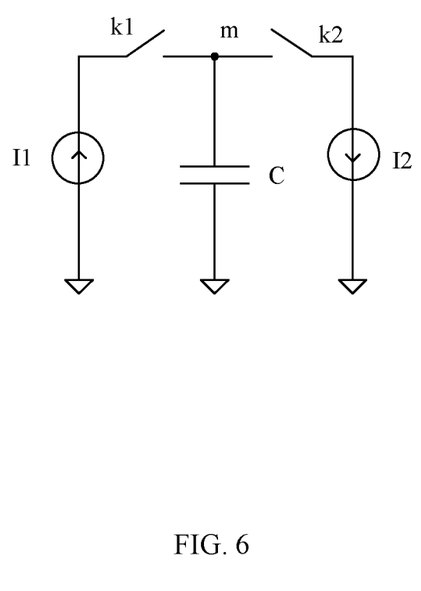
FIG. 6 is a schematic block diagram of an example reference voltage generating circuit, in accordance with embodiments of the present invention.

Referring now to FIG. 6, shown is a schematic block diagram of an example reference voltage generating circuit in accordance with embodiments of the present invention. Charging circuit a can include current source I1 and switch k1. Discharging circuit b can include current source I2 and switch k2. Referring again to FIG. 3, during the gaps between different voltage vector intervals, current detection circuit 2 can generate a comparison signal to control switch k1 to be turned on and switch k2 to be turned off. Then, current source I1 can charge capacitor C until the node voltage of node m reaches the first fixed value. When the comparison signal is activated, switch k1 can be turned off.

When the first time interval ends (e.g., the phase current reaches the first threshold), switch k2 can be controlled to be turned on by the active comparison signal while switch k1 is off. Thus, capacitor C can be discharged to gradually decrease the first fixed value. When the node voltage of node m decreases from the first fixed value to zero, switch k2 can be turned off. It should be understood that the reference voltage generating circuit in this example is one of the circuit structures for generating the reference voltage, and other circuit structures suitable for generating the reference voltage may also be utilized in particular embodiments. For example, current source I1 can be replaced by a voltage source, and/or current source I2 can be replaced by resistors or other components that can consume electricity.

It should be understood that modulation circuit 112 can also be realized by digital circuits (e.g., a programmable controller MCU, FPGA, etc.), in order to generate the exemplified pulse width modulation signal based on time sequence control signals. Current detection circuit 2 (see, e.g., FIG. 3) can sample bus current im of three phase inverter 4, and may generate the comparison signal. For example, current detection circuit 2 can include sampling circuit 221 and comparator 222. Sampling circuit 221 can sample bus current im to obtain a current sampling signal characterizing bus current im. Comparator 222 can compare the current sampling signal against the reference signal that represents the first threshold, in order to generate the comparison signal.

In this example, control circuit 1 can control the pulse width modulation signal to switch from the signal with the first duty cycle to the signal with the second duty cycle, based on the comparison signal. Referring again to FIG. 3, position detection circuit 3 can detect the minimum time length signal that the corresponding phase current rises from zero to the first threshold when every two phases (e.g., U and V phases) of three phase inverter 22 conduct successively, such that the initial position information of the rotor can be determined. Position detection circuit 3 can include timing circuit 31 and comparison circuit 32. Timing circuit 31 can begin to time at the initial time when the corresponding phase current im of three phase inverter 4 increases, and stop timing when the effective comparison signal is received, in order to obtain the time length signal that the corresponding phase current of the three phase inverter rises from zero to the first threshold. For example, the comparison signal can be activated by current detection circuit 2 when the corresponding phase current of three phase inverter 4 reaches the level of the first threshold.

Comparison circuit 32 can compare the time length signals that the corresponding phase current rises from zero to the first threshold when every two phases of three phase inverter 22 conduct successively to determine the minimum time length signal, such that the initial position of the rotor can be obtained based on the minimum time length signal. The inductance value of the excitation phase of the three phase inverter of the motor can correspond to the minimum value when the time length signal is minimum, and the position angle corresponding to the minimum inductance value of the excitation phase of the three-phase inverter of the motor is the straight axis position of the rotor. Thus, the initial position of the rotor can be obtained based on the minimum time length signal. Further, timing circuit 31 can include voltage pulse generating circuit 311 and timer 312. Voltage pulse generating circuit 311 can generate a voltage pulse signal during which the phase current of three-phase inverter 4 rises from zero to the first threshold based on the comparison signal. Timer 312 can count the voltage pulse signal to obtain the time length signal.

Since the phase current may be too small to drive the rotor of the motor to rotate, particular embodiments can accurately detect the initial position of the rotor on the premise that the rotor does not move, and the control circuit can control the three-phase inverter according to the pulse width modulation signal, such that the phase current can slowly rise to the predetermined first threshold and then slowly drop to zero. Therefore, the current may not change greatly, which can avoid introducing noise to the motor in the detection process in order realize silent startup of the motor.

Figure 7:
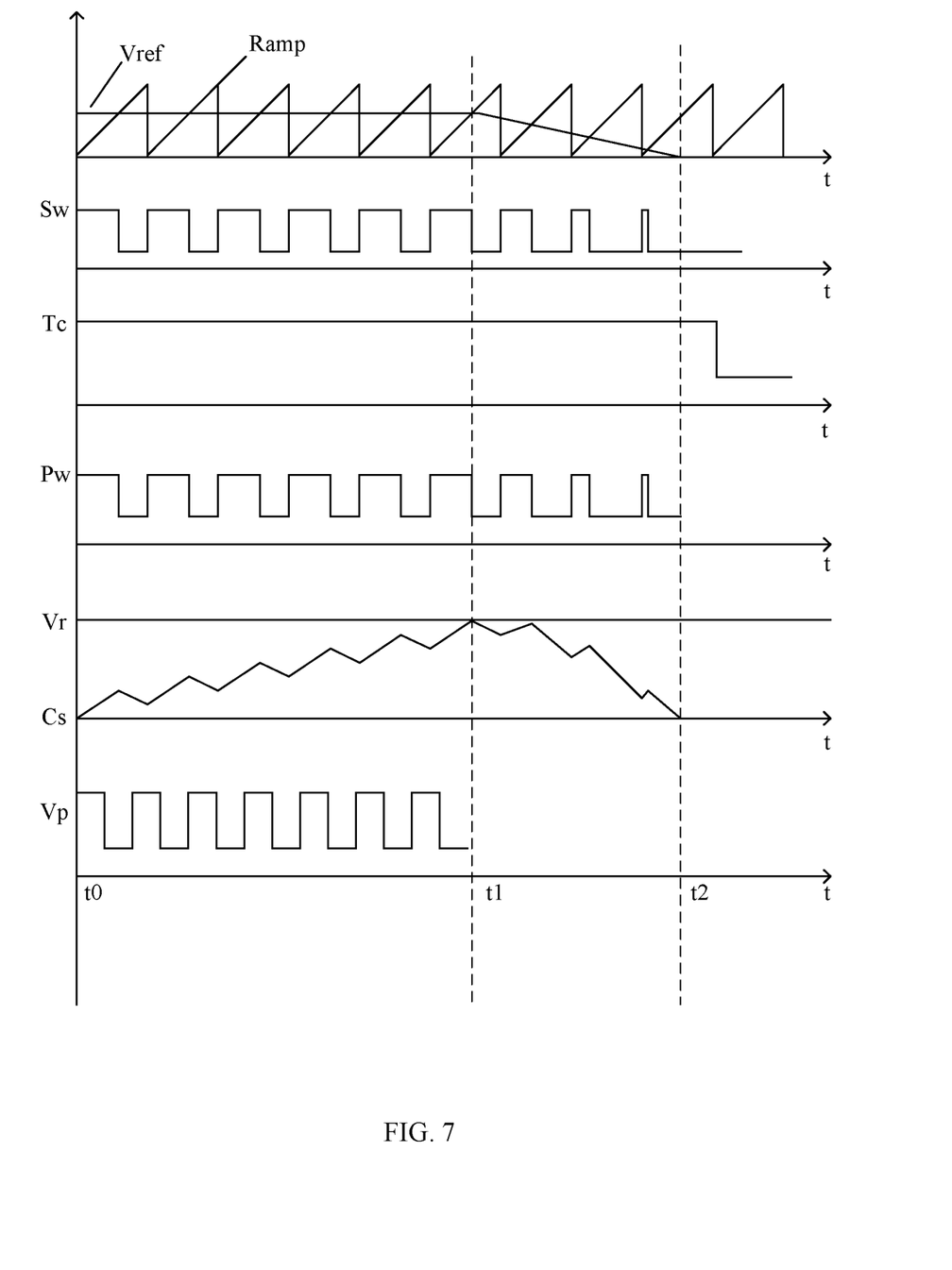
FIG. 7 is a waveform diagram of example operation of the motor, in accordance with embodiments of the present invention.

Referring now to FIG. 7, shown is a waveform diagram of example operation of the motor in accordance with embodiments of the present invention. In this particular example, during the first time interval from t0 to t1 (e.g., the time that the corresponding current rises from zero to the predetermined first threshold), the reference voltage generating circuit can generate a fixed reference voltage Vref1 (e.g., the first fixed value of the reference voltage). The square wave generating circuit can generate square wave signal Sw based on reference voltage Vref1 and ramp signal Ramp, and at this time square wave signal Sw is the signal with the first duty cycle. For example, the first duty cycle is greater than 0.5 and less than or equal to 1. The modulation circuit can generate pulse width modulation signal Pw with the first duty cycle by an AND operation of time sequence control signal Tc and square wave signal Sw with the first duty cycle.

The drive circuit can control the three-phase inverter to switch between the first state and the second state according to pulse width modulation signal Pw in different voltage vector intervals. In the first state, the three-phase inverter can provide the excitation to the corresponding excitation phase. In the second state, the three-phase inverter can stop providing excitation. That is, when pulse width modulation signal Pw is in a high level, the three-phase inverter may be in the first state, and the phase current can gradually increase. When pulse width modulation signal Pw is in a low level, the three-phase inverter can be in the second state, and the phase current may gradually decrease. Therefore, during the time interval from t0 to t1, the phase current may slowly rise to the predetermined first threshold in the sawtooth wave shape, as indicated by current sampling signal Cs characterizing bus current im (e.g., the corresponding phase current) and threshold Vr in FIG. 7.

When current sampling signal Cs characterizing the corresponding phase current rises from zero to threshold Vr, the comparator can output a high level (or a low level). When current sampling signal Cs characterizing the corresponding phase current drops from threshold Vr, the first comparator can output a low level (or a high level). The voltage pulse generating circuit can generate voltage pulse signal Vp when receiving the high level (or the low level), and can stop to generate voltage pulse signal when receiving the low level (or the high lever) until the next voltage vector interval begins. The counter counts voltage pulse signal Vp to obtain the time length signal, which represents the time (e.g., from t0 to t1) during which the corresponding phase current rises from zero to the first threshold.

The inductance value of the excitation phase of the three phase inverter of the motor can correspond to the minimum value when the time length signal is minimum, and the position angle corresponding to the minimum inductance value of the excitation phase of the three-phase inverter of the motor is the straight axis position of the rotor. Thus, the initial position of the rotor can be obtained based on the minimum time length signal.

Figure 8:
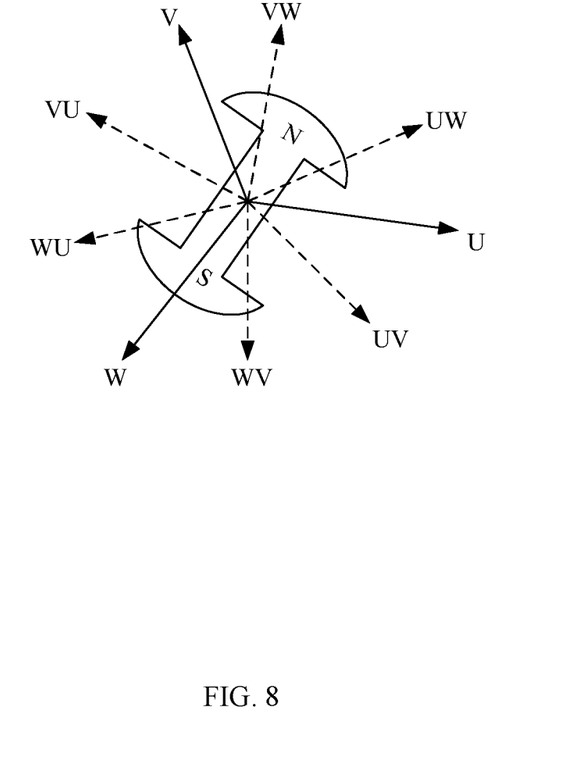
FIG. 8 is a vector-graph of example phase voltages of a three-phase inverter, in accordance with embodiments of the present invention.

Referring now to FIG. 8, shown a vector-graph of phase voltages of a three-phase inverter in accordance with embodiments of the present invention. For example, the motor is a three-phase motor, where the angle between U, V, and W phases is 120°. The different voltage vectors WU, WV, UV, UW, VW, and VU of different excitation phases are also shown in the example of FIG. 8, when the different excitation phases are excited.

Figure 9:
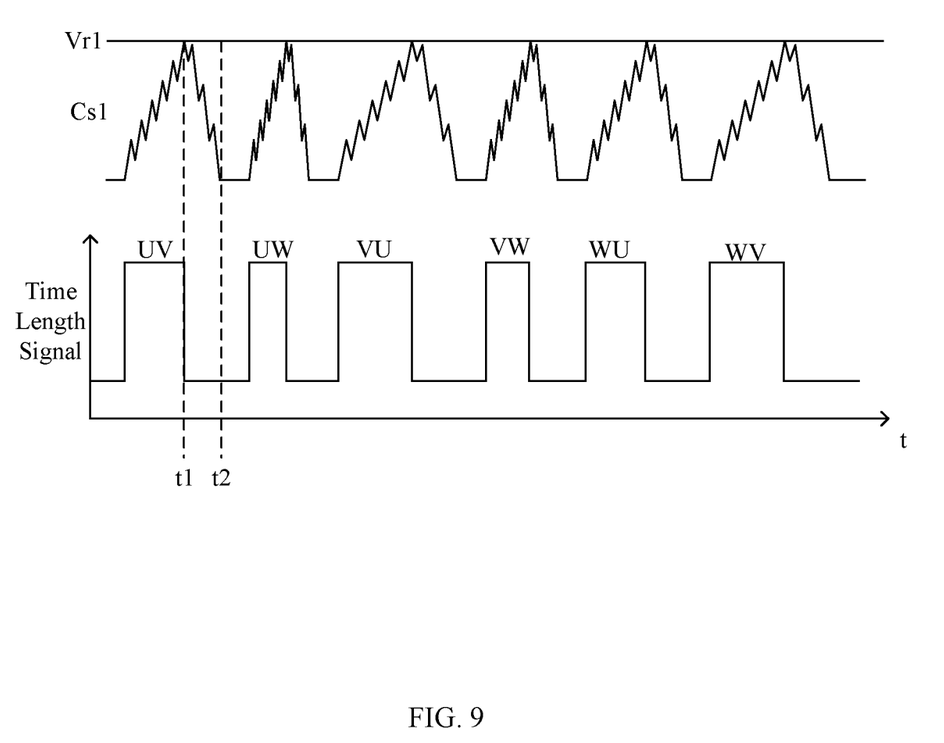
FIG. 9 is a waveform diagram of example operation of the motor drive device, in accordance with embodiments of the present invention.

Referring now to FIG. 9, shown is a waveform diagram of example operation of the motor drive device, in accordance with embodiments of the present invention. In this particular example, when the different excitation phases are excited, the two-phase voltage vector corresponds to different time length signals. When phases U and W are excited, the corresponding time length signal (e.g., the time during which the corresponding phase current rises from zero to the first threshold) is minimum. Thus, the position angle corresponding to the two-phase voltage vector UW is the initial position of the rotor.

During the second time interval from t1 to t2 (e.g., a time during which the corresponding phase current drops from the first threshold to zero), the reference voltage generated by the reference voltage generating circuit may gradually decrease to zero. The square wave signal generating circuit can generate square wave signal Sw with the second duty cycle based on the reference voltage Vref that decreases gradually and ramp signal Ramp. Also, the second duty cycle can gradually decrease (e.g., the second duty cycle can be a value that gradually decreases from 0.5 to 0). The modulation circuit can generate the pulse width modulation signal Pw with the second duty cycle by an AND operation of time sequence control signal Tc and square wave signal Sw with the second duty cycle.

The drive circuit can control the three-phase inverter to switch between the first state and the second state according to pulse width modulation signal Pw in each voltage vector interval. In the first state, the three-phase inverter can provide the excitation to the corresponding excitation phase. In the second state, the three-phase inverter can stop providing excitation. That is, when pulse width modulation signal Pw is in a high level, the three-phase inverter is in the first state, and the phase current gradually increases. When pulse width modulation signal Pw is in a low level, the three-phase inverter is in the second state, and the phase current gradually decreases. Since the duty cycle of pulse width modulation signal Pw gradually decreases, during the second time sequence inverter from t1 to t2, the phase current may slowly drop to zero in a serrated manner. It should be understood that time t2 is before the start of the next voltage vector interval.

Figure 10:
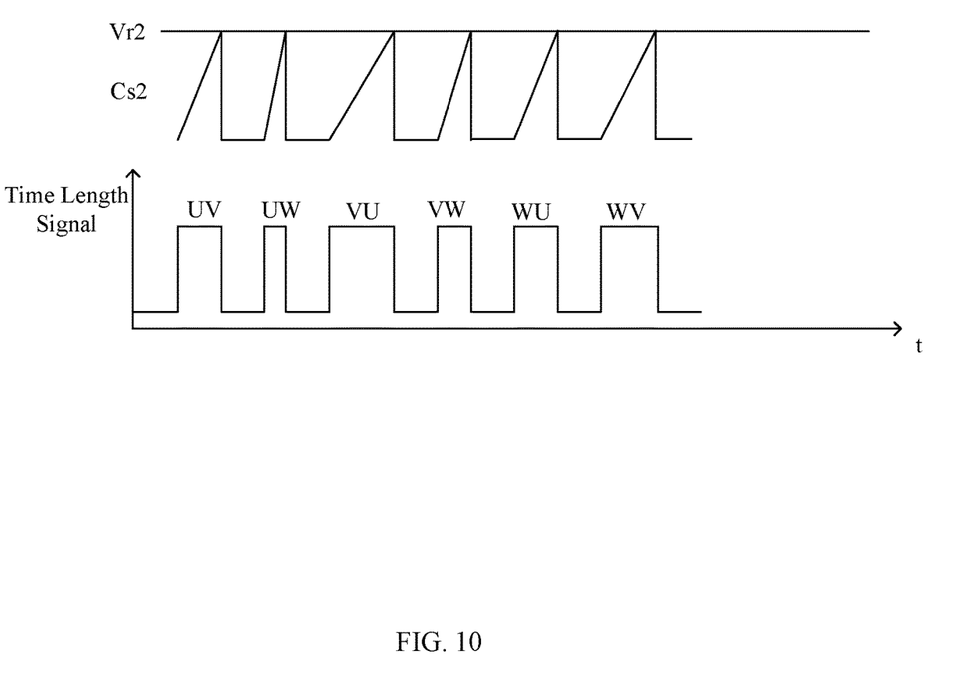
FIG. 10 is a waveform diagram of example operation of the motor drive device, in accordance with embodiments of the present invention.

Referring now to FIG. 10, shown is a waveform diagram of operation of the motor drive device in accordance with embodiments of the present invention. In this particular example, the time length signal represents the time during which the current sampling signal rises from zero to the reference signal when phases U, V, and W of the stator are excited in turn. When phases U and W are excited, the time length signal representing the time during which the current sampling signal rises from zero to the reference signal is minimum. Therefore, the time length corresponding to the two-phase voltage vector UW can indicate the position information of the direct axis of the rotor of the motor, and then the initial position of the rotor can be obtained.

However, when each excitation phase is excited, the input current rises to a predetermined threshold with different slopes according to the inductance values of different excitation phases, and then suddenly drops to zero, as shown. Thus, during the detection process for the initial position of the rotor, noise can be introduced due to sudden changes of the input current, which may not be suitable for applications that require low noise startup. As described herein, the phase current of the three-phase inverter in the drive device of the motor can slowly rise and drop in the sawtooth wave shape during the rising phase and the dropping phase, thereby avoiding the introduction of the noise generated when the motor starts due to sudden changes of the input current.

In particular embodiments, the three-phase inverter can be controlled to alternatively switch between the first state and the second state based on the pulse width modulation signal in the voltage vector intervals, and the time during which the input current of the three-phase inverter in each voltage vector interval rises from zero to the first threshold can be detected to make sure the initial position of the rotor, such that the motor can start silently under the premise that the initial position of the rotor is accurately detected. Particular embodiments can also include a motor, including the three-phase inverter and the motor drive device, and the motor can start silently as described herein.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A motor drive device, comprising:
    a) a control circuit configured to adjust each phase current of a three-phase inverter of a motor, said control circuit being configured to generate a pulse width modulation signal with a first duty cycle;
    b) wherein said phase current of said three-phase inverter rises from zero to a first threshold during a first time interval; and
    c) wherein said phase current is controlled by said pulse width modulation signal to drop gradually in a sawtooth wave shape from said first threshold to zero during a second time interval in order to increase said second time interval.

2. The motor drive device of claim 1, wherein said second time interval ends before said phase current of said three phase inverter switches.

3. The motor drive device of claim 1, wherein said first duty cycle is a variable value.

4. The motor drive device of claim 3, wherein said value of said first duty cycle gradually decreases in sequence with time.

5. The motor drive device of claim 3, wherein said value of said first duty cycle changes in a sinusoidal waveform.

6. The motor drive device of claim 1, wherein in said first time interval, said phase current is controlled by said pulse width modulation signal with a second duty cycle to rise gradually from zero to said first threshold in a sawtooth wave shape.

7. The motor drive device of claim 6, wherein said second duty cycle is a fixed value within a range greater than 0.5 and less than or equal to 1.

8. The motor drive device of claim 1, further comprising a current detection circuit configured to sample a bus current of said three-phase inverter to obtain a current sampling signal and generate a comparison signal by comparing said current sampling signal against said first threshold, wherein said bus current is configured to respectively characterize each phase current.

9. The motor drive device of claim 8, further comprising:
    a) a position detection circuit configured to detect a minimum time length signal that said corresponding phase current of said three-phase inverter rises from zero to said first threshold when every two phases of said three phase inverter sequentially conduct, in accordance with said comparison signal, in order to determine initial position information of a rotor; and
    b) wherein said control circuit is configured to adjust a time sequence control signal based on said initial position information of said rotor and to control said three-phase inverter to start said motor.

10. The motor drive device of claim 9, wherein said position detection circuit comprises:
    a) a timing circuit for starting timing from a beginning of said phase current of said three-phase inverter and stopping timing after receiving an effective comparison signal, in order to obtain a time length signal that said phase current of said three-phase inverter rises from zero to said first threshold; and
    b) a comparison circuit configured to compare said time length signals that said corresponding phase current of said three-phase inverter rises from zero to said first threshold when every two phases of said three-phase inverter sequentially conduct, in order to determine said minimum time length signal, and to obtain an initial position signal of said rotor based on said minimum time length signal.

11. The motor drive device of claim 8, wherein said position detection circuit starts to operate when said motor is in a stationary state.

12. The motor drive device of claim 1, wherein said control circuit is configured to control said pulse width modulation signal generated by said control circuit to switch from a signal with said first duty cycle to a signal with a second duty cycle.

13. The motor drive device of claim 1, wherein said control circuit comprises:
    a) a time sequence control circuit configured to generate a time sequence control signal to define voltage vector intervals corresponding to said phase current of said three-phase inverter;
    b) a modulation circuit configured to generate said pulse width modulation signal based on said time sequence control signal and a square wave signal; and
    c) a drive circuit configured to control said three-phase inverter based on said pulse width modulation signal.

14. The motor drive device of claim 13, wherein said square wave signal is generated by comparing a reference voltage that is a first fixed value in said first time interval and a variable value in said second time interval, such that said pulse width modulation signal corresponds to said reference voltage.

15. A method of controlling a motor drive device of a motor, the method comprising:
   a) controlling, by a control circuit, a phase current of a three-phase inverter of said motor to rise from zero to a first threshold in a first time interval;
   b) generating, by said control circuit, a pulse width modulation signal with a first duty cycle; and
   c) controlling, by said pulse width modulation signal, said phase current to drop gradually in a sawtooth wave shape from said first threshold to zero in a second time interval in order to increase said second time interval.

16. The method of claim 15, wherein said second time interval ends before said phase current of said three phase inverter switches.

17. The method of claim 15, wherein said first duty cycle decreases gradually in sequence with time.

18. The method of claim 15, further comprising:
   a) sampling, by a current detection circuit, a bus current of said three-phase inverter to obtain a current sampling signal; and
   b) generating a comparison signal by comparing said current sampling signal against said first threshold, wherein said bus current is configured to respectively characterize each phase current.

19. The method of claim 18, further comprising detecting, by a position detection circuit, a minimum time length signal that said corresponding phase current of said three-phase inverter rises from zero to said first threshold when every two phases of said three phase inverter sequentially conduct, in accordance with said comparison signal, in order to determine initial position information of a rotor.

20. The method of claim 19, further comprising adjusting, by said control circuit, a time sequence control signal based on said initial position information of said rotor and to control said three-phase inverter to start said motor.

* * * * *